UNITED STATES PATENT OFFICE 1,976,678

PRODUCTION OF POLYMERIZATION PRODUCTS

Max Wittwer, Ludwigshafen-on-the-Rhine, Germany, assignor to I. G. Farbenindustrie Aktiengesellschaft, Frankfort-on-the-Main, Germany No Drawing. Application February 1, 1933, Serial No. 654,769. In Germany February 12, 1932

9 Claims. (Cl. 260—54)

The present invention relates to the production of polymerization products, in particular to polymerization products from alkylene oxides.

In the U. S. P. No. 1,921,378, a process for the production of polymerization products of ethylene oxide and α-propylene oxide has been described according to which vapors of the said alkylene oxides are brought into contact with solid, non-metallic, inorganic polymerization catalysts while heating. When employing catalysts having an alkaline nature, from solid to liquid wax-like products of a higher stage of polymerization than dioxane are obtained, whereas dioxane is obtained when acid reacting catalysts of the said kind are used.

I have now found that the said polymerized compounds are obtained in an especially advantageous and simple manner by carrying out the polymerization of ethylene or α-propylene oxide by means of catalysts having an alkaline nature in the presence of solvents inert to the said alkylene oxides. As a further modification the present process may be carried out not only in the vapor phase, but also in the liquid phase. Thus, for example, liquid or gaseous ethylene oxide may be contacted with the catalyst having an alkaline nature, as for example metallic sodium, sodium alcoholates, caustic soda, caustic potash or sodium acetate and alkaline earth metal hydroxides, which are dissolved or suspended in the solvent, at the rate at which the polymerization proceeds, if desired with the employment of increased pressure.

As solvents may be mentioned those organic liquids which themselves are inert to the alkylene oxides, i. e. which are incapable of reacting with the added oxide, as for example aliphatic, aromatic or hydroaromatic hydrocarbons, or ethers or esters which are free from alcoholic and primary or secondary amino groups, since otherwise, as for example when employing alcohols, a part of the alkylene oxide reacts with the solvent, and the product thus formed can only be separated from the desired reaction product with difficulty besides the loss of initial material. Specific solvents suitable for use are for example ethylene chloride or bromide, acetone, carbon tetrachloride, benzene, toluene, xylene, cyclohexane, di-ethyl ether, di-amyl ether, ethyl acetate and butyl acetate. It is especially advantageous to use the corresponding polymerized oxide in the liquid state as the solvent, for example polymerized propylene oxide for the polymerization of propylene oxide. The process may be carried out continuously or discontinuously; in the former case the polymerized reaction product is removed at the rate at which it is formed from the polymerization vessel, as for example an autoclave. The remaining reaction conditions are the same as those described in the aforesaid patent. In comparison to the polymerization of the alkylene oxides in the liquid phase and in the presence of catalysts the present invention permits one to strictly avoid any danger of explosion and furnishes considerably higher yields in a given period of working than the process according to the said patent, the present process being carried out, moreover, in much more simple and less expensive apparatus.

The following examples will further illustrate the nature of this invention but the invention is not restricted to these examples.

Example 1

10 kilograms of polymerized ethylene oxide having a melting point of from 57° to 62° C. are introduced into a stirring vessel provided with a reflux condenser and having a capacity of about 100 litres, and the vessel is heated to from about 110° to 130° C. after adding 1 kilogram of powdered caustic potash. Vaporous ethylene oxide is then led into the mixture at the rate at which it is polymerized. In this manner without special precautions an amount of ethylene oxide equal to that originally present may be polymerized within from 3 to 4 hours in a simple manner. The speed of introduction of the ethylene oxide may be increased according to the content of the vessel of polymeric oxide which gradually becomes greater. The conversion is quantitative and the product is very pure and uniform.

Example 2

10 kilograms of polymerized ethylene oxide having a melting point of from 57° to 62° C. and 1 kilogram of powdered caustic potash are introduced as described in Example 1 into a stirring vessel provided with a reflux condenser. After heating the mixture to from 110° to 130° C., liquid ethylene oxide is allowed to flow in at the rate at which it is polymerized. In this manner an amount of polymerized ethylene oxide equal to that already present is obtained in the course of about 4 hours. The yield in this case also is quantitative.

Example 3

A mixture of polymerized ethylene oxide having a melting point of from 57° to 62° C. and 10 percent of powdered caustic potash is heated to from about 120° to 130° C. in an autoclave. By pressing in liquid ethylene oxide in small amounts the pressure is raised to from about 2 to about 5 atmospheres and the ethylene oxide is rapidly converted into the wax-like polymerized compound in a manner free from danger. The supply of ethylene oxide may be effected either by adding fresh amounts when the increase in temperature and pressure occurring in the autoclave has subsided or by adding the ethylene oxide continuously, but very slowly. The yield is quantitative.

*Example 4*

10 kilograms of highly viscous polymerized propylene oxide and 1 kilogram of powdered caustic potash and are introduced into a stirring vessel of about 100 litres capacity. After heating the mixture to from about 120° to 130° C., vaporous propylene oxid is led in at such a speed that no unchanged propylene oxide escapes. In this manner an amount of polymerized product equal to that already present may be simply obtained in about 3 hours. The speed of introduction of the propylene oxide may be increased to correspond to the increasing contents of the vessel. The yield of polymerized propylene oxide is quantitative and the product is very pure.

*Example 5*

10 kilograms of highly viscous polymerized propylene oxide and 1 kilogram of powdered caustic potash are introduced into a vessel as described in Example 4. After heating to from 120° to 130° C. liquid propylene oxide is led in at the rate at which it is polymerized. After about 3 hours an amount of polymerization product is formed equal to that already present. The yield is quantitative.

*Example 6*

Liquid propylene oxide is polymerized simply and rapidly by pressing it into an autoclave containing a mixture of highly viscous polymerized propylene oxide and 10 percent by weight of the polymeric propylene oxide of powdered caustic potash which has been heated to from 110° to 130° C. The propylene oxide is supplied in the manner described in Example 3.

*Example 7*

Vapors of ethylene oxide are introduced into a mixture of 10 kilograms of ethyl benzene (boiling point 136° C.) and 1 kilogram of pulverized potassium hydroxide heated to from 120° to 130° C. in a stirring vessel provided with a reflux condenser while vigorously stirring, the ethylene oxide being introduced at the rate at which it is polymerized in the said mixture. After the reaction, the ethyl benzene which is absorbed by the gradually increasing quantity of the polymerization product of the ethylene oxide, may be removed from the latter by heating in vacuo or may be left therein if it is not injurious in the desired application of the polymerization product.

Instead of the ethyl benzene, dibutyl ether (boiling point 141° C.) may be employed.

*Example 8*

A mixture of dioxane with 10 percent of its weight of pulverized potassium hydroxide is heated in an autoclave to about 120° C., liquid ethylene oxide then being gradually pressed into the mixture. Fresh quantities of ethylene oxide are added preferably only when the increase in pressure and in temperature occurring in the autoclave has subsided and is decreasing again. The dioxane may be removed from the polymerization product by heating in vacuo or may be left therein as desired.

*Example 9*

Liquid propylene oxide is introduced, while vigorously stirring, into a mixture of 10 kilograms of dibutyl ether and 1 kilogram of pulverized potassium hydroxide, heated to from 120° to 130° C. in the manner described in Example 7. The dibutyl ether may be distilled off in vacuo from the resulting polymeric propylene oxide or may be left therein.

What I claim is:—

1. A process for the production of polymerization products of a higher stage of polymerization than dioxane, which comprises contacting, while warming, an alkylene oxide selected from the group consisting of ethylene oxide and α-propylene oxide with an alkaline reacting compound of a metal selected from the group consisting of the alkali metals and alkaline earth metals in the presence of an organic liquid inert to the alkylene oxide employed.

2. A process for the production of polymerization products of a higher stage of polymerization than dioxane, which comprises contacting, while warming, an alkylene oxide selected from the group consisting of ethylene oxide and α-propylene oxide with an alkaline reacting compound of an alkali metal, in the presence of an organic liquid inert to the alkylene oxide employed.

3. A process for the production of polymerization products of a higher stage of polymerization than dioxane, which comprises contacting, while warming vapors of an alkylene oxide selected from the group consisting of ethylene oxide and α-propylene oxide with a mixture of an alkaline reacting compound of a metal selected from the group consisting of the alkali metals and alkaline earth metals and of an organic liquid inert to the alkylene oxide employed.

4. A process for the production of polymerization products of a higher stage of polymerization than dioxane, which comprises introducing in the liquid state an alkylene oxide selected from the group consisting of ethylene oxide and of α-propylene oxide into a mixture of an alkaline reacting compound of a metal selected from the group consisting of the alkali metals and alkaline earth metals and of an organic liquid inert to the alkylene oxide employed, while warming to from about 40° to about 200° C.

5. A process for the production of polymerization products of a higher stage of polymerization than dioxane, which comprises introducing in the liquid state an alkylene oxide selected from the group consisting of ethylene oxide and α-propylene oxide into a mixture of an alkaline reacting compound of an alkali metal and of a liquefied polymerized alkylene oxide inert to the alkylene oxide employed, while warming to from about 100° to about 160° C.

6. A process for the production of polymerization products of a higher stage of polymerization than dioxane, which comprises introducing liquid ethylene oxide into a mixture of an alkaline reacting compound of an alkali metal and of an organic liquid inert to ethylene oxide employed, while warming to from about 100° to about 160° C.

7. A process for the production of polymerization products of a higher stage of polymerization than dioxane, which comprises introducing liquid ethylene oxide into a mixture of an alkaline reacting compound of an alkali metal and of a liquefied polymerized alkylene oxide inert to the alkylene oxide employed, while warming to from about 100° to about 160° C.

8. A process for the production of polymerization products of a higher stage of polymerization than dioxane, which comprises introducing liquid ethylene oxide into a mixture of an alkali metal hydroxide and of a liquefied polymerized alkylene oxide, inert to the alkylene oxide employed, while warming to from about 100° to about 160° C.

9. A process for the production of polymerization products of a higher stage of polymerization than dioxane, which comprises introducing liquid ethylene oxide into a mixture of an alkaline reacting compound of an alkali metal and of a liquefied polymerized ethylene oxide having a melting point of from 57° to 62° C., while warming to from 100° to about 160° C.

MAX WITTWER.